United States Patent
Selstam et al.

(10) Patent No.: US 12,234,413 B2
(45) Date of Patent: Feb. 25, 2025

(54) DESULFURIZATION PROCESS OF WASTE TIRE PYROLYSIS OIL TO PRODUCE FUEL

(71) Applicant: Wastefront AS, Oslo (NO)

(72) Inventors: Henrik Selstam, Mölnlycke (SE); Jorge Moreno Trejo, Fornebu (NO); John William Hemmings, Fripp Island, SC (US)

(73) Assignee: Wastefront AS, Oslo (NO)

( * ) Notice: Subject to any disclaimer, the term of this patent is extended or adjusted under 35 U.S.C. 154(b) by 0 days.

(21) Appl. No.: 18/260,230

(22) PCT Filed: Dec. 21, 2021

(86) PCT No.: PCT/US2021/064579
§ 371 (c)(1),
(2) Date: Jun. 30, 2023

(87) PCT Pub. No.: WO2022/146778
PCT Pub. Date: Jul. 7, 2022

(65) Prior Publication Data
US 2024/0076556 A1    Mar. 7, 2024

Related U.S. Application Data

(60) Provisional application No. 63/131,997, filed on Dec. 30, 2020.

(51) Int. Cl.
*C10G 1/10* (2006.01)
*C10G 1/00* (2006.01)
(Continued)

(52) U.S. Cl.
CPC ............... *C10G 1/10* (2013.01); *C10G 1/002* (2013.01); *C10G 7/003* (2013.01); *C10G 45/02* (2013.01); *C10K 1/103* (2013.01)

(58) Field of Classification Search
CPC ........ B01D 2251/304; B01D 2257/304; B01D 2257/702; B01D 53/002; B01D 53/047;
(Continued)

(56) References Cited

U.S. PATENT DOCUMENTS 6,657,095 B1    12/2003    Holden et al.
7,416,641 B2    8/2008    Denison
(Continued)

FOREIGN PATENT DOCUMENTS

CA    3005593 A    5/2018
CN    106590713 A    4/2017
(Continued)

OTHER PUBLICATIONS

Serefentse et al., A Review of the Desulfphuriztion Methods Used for Pyrolysis Oil, Science Direct, Procedia Manufacturing, vol. 35, Jul. 13, 2019, pp. 762-768 (Year: 2019).*

(Continued)

*Primary Examiner* — Ellen M McAvoy
*Assistant Examiner* — Chantel Graham
(74) *Attorney, Agent, or Firm* — DLA Piper LLP (US)

(57) ABSTRACT

A method and system desulfurizes fuel produced from pyrolysis of waste tires and includes hydroprocessing tire pyrolysis oil to desulfurize the tire pyrolysis oil and obtain a hydroprocessed pyrolysis oil. The hydroprocessed oil is distilled into at least two environmentally fuel products selected from the group consisting of kerosene, naphtha, fuel oil, fuel and diesel. By combining hydroprocessing with distillation, and advantageously recycling byproducts, the methods of this disclosure allow for conversion of waste tires into fuel in a manner that is commercially viable and sustainable.

6 Claims, 2 Drawing Sheets

(51) Int. Cl.
*C10G 7/00* (2006.01)
*C10G 45/02* (2006.01)
*C10K 1/10* (2006.01)

(58) Field of Classification Search
CPC .............. B01D 53/1468; B01D 53/1475; B01D 53/78; C10G 1/002; C10G 1/10; C10G 45/02; C10G 49/007; C10G 7/003; C10K 1/101; C10K 1/103; C10L 1/04
See application file for complete search history.

(56) References Cited

U.S. PATENT DOCUMENTS

| | | | |
|---|---|---|---|
| 7,947,248 B2 | 5/2011 | Hamby et al. | |
| 7,959,890 B2 | 6/2011 | MacIntosh et al. | |
| 8,323,793 B2 | 12/2012 | Hamby et al. | |
| 8,425,731 B2 | 4/2013 | Ali et al. | |
| 8,888,961 B2 | 11/2014 | Horn et al. | |
| 9,216,365 B2* | 12/2015 | Kuo | C10K 1/32 |
| 9,777,159 B2 | 10/2017 | Horn et al. | |
| 10,662,381 B2 | 5/2020 | Beaver et al. | |
| 11,066,604 B2 | 7/2021 | Hornung et al. | |
| 2008/0128259 A1 | 6/2008 | Kostek et al. | |
| 2008/0202913 A1 | 8/2008 | Kolev et al. | |
| 2010/0121121 A1 | 5/2010 | Niu | |
| 2010/0133085 A1 | 6/2010 | Hutchins et al. | |
| 2011/0107668 A1 | 5/2011 | Wu et al. | |
| 2011/0116986 A1 | 5/2011 | Balint et al. | |
| 2012/0000188 A1 | 1/2012 | Bronshtein et al. | |
| 2012/0308441 A1 | 12/2012 | Hansen | |
| 2014/0114097 A1* | 4/2014 | Hemmings | C10G 1/10 208/402 |
| 2016/0045841 A1* | 2/2016 | Kaplan | C01B 32/05 429/49 |
| 2017/0029705 A1 | 2/2017 | Schneider | |
| 2018/0179447 A1* | 6/2018 | Vasbinder | B01D 45/14 |
| 2019/0161683 A1* | 5/2019 | Narayanaswamy | C10G 69/14 |
| 2019/0177626 A1 | 6/2019 | Ramamurthy et al. | |
| 2019/0359894 A1 | 11/2019 | Heidel et al. | |
| 2020/0123390 A1 | 4/2020 | Wibbeler et al. | |
| 2020/0339819 A1 | 10/2020 | Kim | |
| 2022/0081621 A1 | 3/2022 | Bingham | |

FOREIGN PATENT DOCUMENTS

| | | |
|---|---|---|
| CN | 107298983 A | 10/2017 |
| CN | 108219823 A | 6/2018 |
| CN | 109207180 A | 1/2019 |
| CN | 110305678 A | 10/2019 |
| EP | 2 454 342 B1 | 12/2017 |
| EP | 2 980 186 B1 | 12/2017 |
| EP | 2 488 605 B1 | 4/2020 |
| KR | 10-0951575 B1 | 4/2010 |
| WO | 99/08849 A1 | 2/1999 |
| WO | 02/38658 A3 | 12/2002 |
| WO | 2007/038903 A1 | 4/2007 |
| WO | 2008/122255 A1 | 10/2008 |
| WO | 2010/127664 A1 | 11/2010 |
| WO | 2014/057430 A1 | 4/2014 |
| WO | 2015/010171 A1 | 1/2015 |
| WO | 2018/014922 A1 | 1/2018 |
| WO | 2019/155183 A1 | 8/2019 |
| WO | 2020/057774 A1 | 3/2020 |

OTHER PUBLICATIONS

Somsri, Upgrading of Pyrolysis Oil, Degree Project In Chemical Science and Engineering, KTH Royal Institute of Technolgy School of Engineering Sciences in Chemistry, Biotechnology and Health, 2018, (pp. 1-30) (Year: 2018).*

International Search Report dated Mar. 10, 2022, of counterpart International Application No. PCT/US2021/064579.

International Preliminary Report on Patentability dated Jul. 4, 2023, of counterpart International Application No. PCT/US2021/064579.

Serefentse, R. et al., "A review of the desulphurization methods used for pyrolysis oil," *Procedia Manufacturing*, 2019, vol. 35, pp. 762-768.

Somsri, S. "Upgrading of Pyrolysis Oil," *Degree Project in Chemical Science and Engineering*, KTH Royal Institute of Technology, School of Engineering Sciences in Chemistry, Biotechnology and Health, 2018, pp. 1-30.

Extended European Search Report dated Oct. 14, 2024, of counterpart European Patent Application No. 21916233.6.

* cited by examiner

DESULFURIZATION PROCESS OF WASTE TIRE PYROLYSIS OIL TO PRODUCE FUEL

TECHNICAL FIELD

This disclosure relates to a process of economically recovering pyrolysis oil from waste tires. More specifically it relates to a process of recovering desulfurized fuel oil and fuel gas from waste tires by using a combination of hydroprocessing and distillation with the optional inclusion of power production from byproducts and electrolytic hydrogen production from the low-cost power co-produced.

BACKGROUND

Tires are designed to withstand harsh conditions and, as a result, end-of-life tires present several challenges for disposal. The decomposition of end-of-life tires into small, predominantly hydrocarbon fragments comparable to the typical constituents of crude oil is a difficult process. Several methods to break down end-of-life tires are practiced, including microwave and conventional pyrolysis, as well as solvent-based processes.

Pyrolysis is a high temperature process in which materials are treated in the absence of oxygen and in which high molecular weight materials break down to form lower molecular weight materials. Generally, the products of pyrolysis include materials that are gaseous at ambient temperature (e.g., fuel gas), materials that are liquid at ambient temperature (e.g., pyrolysis oil) and materials that are solid at ambient temperature (e.g., char). Pyrolysis oil obtained from pyrolysis of waste tires is a complex mixture of hydrocarbons as well as components containing sulfur, nitrogen and oxygen that can be traced back to the structures of the polymers initially present in the tires.

For example, natural rubber is used in combination with other elastomers to maintain flexibility in the tire, with styrene butadiene rubber ("SBR") being a common rubber component. Styrene-butadiene rubber tends to break down into low molecular weight aromatic molecules containing a single benzene ring such as toluene, xylenes, ethylbenzene, styrene, oligomers containing several benzene rings, and light hydrocarbon gases (the remnants of the carbon chains between the benzene rings in the original SBR). Natural rubber is poly-cis-isoprene and tends to break down into oligomers of isoprene, with some rearrangement reactions leading to terpenes such as limonene. The rubber present in tires is vulcanized, which means that there are sulfur bridges between polymer chains. During pyrolysis, the sulfur bridges are easily scissioned and form mercaptans as well as hydrogen sulfide.

In addition to the materials derived from rubber, there are a number of additional sources of organic materials in tires. These include other polymers, both polyamides and polyesters that are present in the fabric components of some tires and break down into polar molecules containing significant amounts of nitrogen and oxygen such as benzoic acid and caprolactam. In addition, there are molecules derived from substances initially added as vulcanizing agents such as 2-mercapto-benzothiazole that can break down to benzothiazole. Tire production also generally includes adding carbon black to strengthen the rubber and a combination of steel and fibers to build the belts and reinforce the tires.

In addition to the primary pyrolysis reactions, numerous secondary reactions also take place such as aromatization of unsaturated rings (for example, limonene to cymene) and recombination of fragments. These add to the complexity of the material and lead to a large number of distinct components being present in tire pyrolysis oil at low concentrations.

In terms of the composition, the pyrolysis oil can be considered to be largely composed of hydrocarbons (typically 80%-90%), roughly equally divided between aliphatic and aromatic materials with a lower amount (typically 10-20%) of highly polar molecules containing oxygen, nitrogen and sulfur compounds. The amounts of oxygen, nitrogen and sulfur present are typically 0.3-0.7%, 0.5-1.0% and 0.7-1.5%, respectively.

Due to the complex composition and breakdown processes of tires, tire pyrolysis oil differs from crude oil-derived materials used to make fuel. For example, in tire pyrolysis oil, there is very significant olefinnic unsaturation. This is inherent in the unsaturated nature of the rubber polymers. As a consequence, tire pyrolysis oils have a very high bromine number (typically over 150). In addition, due to the presence of such materials as benzothiazoles, tire pyrolysis oil contains some difficult to hydrogenate sulfur (in addition to the mercaptan sulfur that is relatively easy to remove).

It will be apparent to those skilled in the art of hydrogenation that, for any feasible catalyst, olefins are very reactive while materials such as benzothiazole are unreactive. Even if mild conditions are employed, hydrogen consumption will be very high. Furthermore, with mild conditions, much of the sulfur will not be converted. Consequently, more severe conditions are needed to address the refractory sulfur species and that tends to have the unintended consequence of converting relatively valuable aromatic materials to naphthenic materials.

Accordingly, in view of the complex composition of waste tires, there are multiple practical challenges in designing a process of decomposing tires into environmentally acceptable products in a way that is economically sustainable.

SUMMARY

We thus provide a method of desulfurizing fuel produced from pyrolysis of waste tires comprising hydroprocessing a tire pyrolysis oil to desulfurize the tire pyrolysis oil and obtain a hydro-processed pyrolysis oil and distilling the hydro-processed pyrolysis oil into at least two fuel products selected from the group consisting of kerosene, naphtha, fuel oil, fuel and diesel. We also provide fuel products comprising the products thereof.

We further provide a system that desulfurizes tire pyrolysis oil comprising a hydroprocessor configured to desulfurize the tire pyrolysis oil to obtain a hydro-processed pyrolysis oil; and a distillation column configured to distill the hydro-processed pyrolysis oil supplied from the hydroprocessor to obtain at least two fuel products selected from the group consisting of kerosene, naphtha, fuel oil, fuel and diesel.

DETAILED DESCRIPTION

Figure 1:
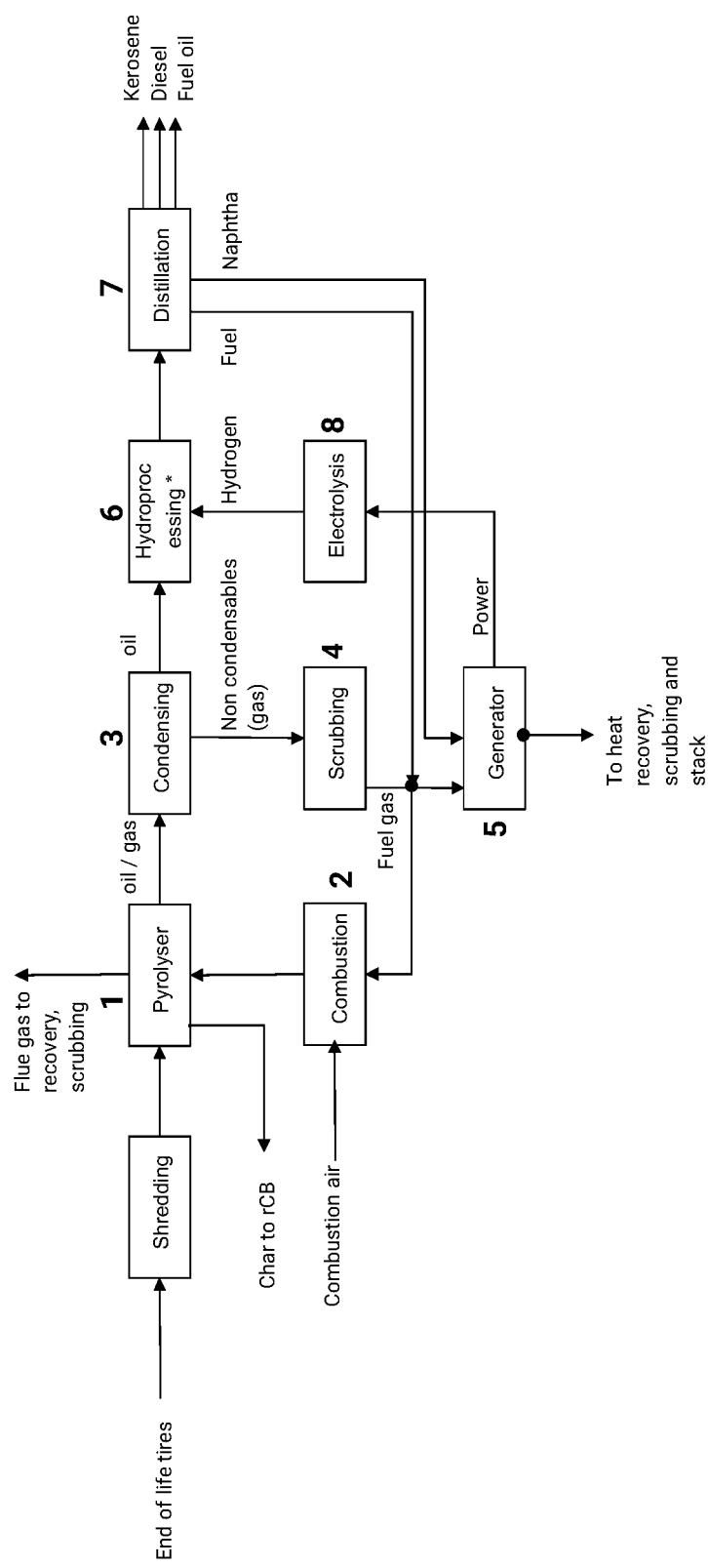
FIG. 1 shows a first exemplary system presented as a block flow diagram.

Our process is based on hydro-treating and distilling the oil and gas obtained from pyrolysis of waste tires to convert impurities and produce high-quality fuel. It also involves the optional production of low-cost power from byproduct fuel and production of low-cost hydrogen from that power by electrolysis. The availability of low-cost hydrogen cost is highly beneficial in view of the high demand of hydrogen due to the high content of olefins in tire pyrolysis oil. The process may also include conversion of the heavy material by thermal cracking or hydrocracking.

The hydrotreatment process is adapted to the peculiar nature of tire pyrolysis oil, which is chemically quite different from similar boiling range materials familiar in the refining industry (such as coker gas oil) in that it typically contains a very large amount of olefinnic material. The high content of olefinic material in tire pyrolysis oil consumes large quantities of hydrogen in hydroprocessing. Tire pyrolysis oil may also contain refractory nitrogen-sulfur molecules such as benzothiazoles that require severe conditions to be converted.

In view of the unique composition of tire pyrolysis oil, we provide a hydroprocessing reactor adapted to support the higher-than-typical hydrogen demand (and therefore heat release) by recirculation of hydrogenated material. Due to the relatively small scale of production and the high hydrogen demand per ton of product, hydrogen costs were previously considered to be prohibitive as the scale is insufficient for on-site production of hydrogen by conventional technologies such as steam methane reforming. Additionally, at the quantities required, merchant hydrogen (e.g. from tube-trailers or liquid) is prohibitively expensive.

Consequently, conversion of lower quality, difficult-to-market fuel products of the tire pyrolysis oil (including fuel gas) to electricity using adapted conventional generators, integrated with production of electrolytic hydrogen (using, for example, alkali cells or the like), makes it feasible to have economically sustainable hydrogen available on-site. This method dramatically lowers the effective cost of hydrogen, which not only makes hydroprocessing cost-effective, but also enables significant simplifications in the system. For example, as hydrogen can be obtained at low-cost, it is not essential to recover maximum hydrogen after distillation. This means that systems typically required for hydrogen recovery (such as pressure swing adsorption) may be omitted to save capital cost.

In an exemplary practice of the methods, waste tires may be shredded to produce rubber chips. Rubber chips having a size of approximately 20 mm are suitable. Most of the steel wires may be removed by a magnetic separator after shredding or the like. The remaining steel wire fragments are preferably less than about 2 wt % of the total mass of the chips and may pass forward to pyrolysis.

The rubber chips may be fed to the pyrolysis system, preferably by an automatic conveyor. The pyrolysis system may generally include a parallel bank of pyrolysis reactors, a heat supply system, flue gas recycling equipment and other processes for the separation and upgrading of products. Fuel gas is combusted with air and recycled flue gas to provide heat for pyrolysis.

In steady operation, the fuel gas may advantageously be the recycled, non-condensable fraction of the pyrolysis product, which may mainly comprise hydrogen, carbon oxides, methane and higher hydrocarbons (e.g., ethylene, propylene, ethane, propane and heavier olefins and paraffins). Heat may be supplied to the pyrolysis reactor indirectly by hot gases from a combustion chamber. Use of hot flue gas recycle to provide heat for pyrolysis limits the metal temperature in the reactor and, consequently, reduces the amount of secondary cracking that occurs. Thus, use of hot flue gases to supply heat for pyrolysis is particularly advantageous in pyrolyzing waste tires due to the high potential of secondary cracking.

Pyrolysis generally occurs in two stages: primary pyrolysis and secondary cracking. The primary reactions typically involve thermal scissioning of chemical bonds liberating fragments of polymer chains consisting of one or several monomer groups. The primary cracking reaction may suitably be carried out at a temperature of about 350° C. to about 800° C., more preferably about 400° C. to about 550° C., and preferably slightly over atmospheric pressure. The residence time in the reactor can vary depending on the type of tires. In primary pyrolysis, the heat supplied in the reactor thermally decomposes the shredded tire chips, thereby driving off volatile materials and leaving behind carbon black and inorganic materials as solids, with some of the heavier hydrocarbons adsorbed onto the solids. The vapors or volatiles produced initially from the waste tires consists of a wide variety of hydrocarbons, some of which can then undergo subsequent secondary reactions.

There are several different types of secondary reactions that can occur in pyrolysis, including chain transfer reactions, addition reactions and further scissioning to produce coke and low molecular weight molecules. Some of the secondary reactions occur in the vapor phase, but many are heterogenous reactions involving molecules in the vapor phase and a solid surface. Some of the secondary reactions (such as Diels-Alder addition of olefin fragments to isoprene units to form substituted 2-hexenes—understood to be catalyzed by certain of the inorganics) form valuable products. However, other secondary reactions such as over-cracking of condensable vapor phase hydrocarbons to gases and coke, reduce the product slate value.

The controllable variables in pyrolysis are the temperature profile through the reactor and the residence time of solids in the reactor. Another important parameter is the contact time of vapors with the solids and this is determined by the design of the reactor. In principle though, once released to the vapor phase, material leaves the reactor in far less time than the material that stays in the solid phase.

In general, both the materials that leave the reactor in the vapor phase and the solid phase are commercially valuable. The vapor phase contains a condensable fraction that becomes pyrolysis oil and non-condensable fuel gas. The solid phase contains carbon black, residual vulcanization catalyst (e.g., zinc sulfide) and other inorganic materials (e.g., silica) in addition to adsorbed heavy oil (e.g., toluene extractable materials) and amorphous carbon formed from secondary reactions (e.g., coke). The solid material may become valuable recovered carbon black (rCB) after additional processing.

In view of the above considerations, it is possible to change the yields and properties of products from tire pyrolysis to some extent by varying the temperature and the residence time in the pyrolysis reactor. However, there are conflicting requirements in that conditions that may improve the rCB may lead to a less desirable liquid product. Furthermore, conditions that improve the quality of the liquid production may influence also the rCB quality. For example, a higher temperature may remove the adsorbed oil and improve the rCB. However, the higher temperature may also lay down additional amorphous carbon that lowers the quality of rCB.

Regardless of how the pyrolysis reactor is operated, the pyrolysis oil produced typically has a large amount of sulfur compounds, oxygenates, nitrogen compounds, olefins and aromatics. In particular, the sulfur content of tire pyrolysis oil may exceed 0.5%, which limits its value and utility as a fuel due to environmental concerns. Consequently, additional processing of tire pyrolysis oil may be necessary to render the tire pyrolysis oil into a practically usable material.

Vapors leaving the pyrolysis reactors are cooled so that the heavier fraction condenses to form tire pyrolysis oil and the lighter material remains in the vapor phase. The lighter material is washed using water to form a fuel gas. The wash liquor may contain a high concentration of alkali to facilitate removal of hydrogen sulfide (with some incidental carbon dioxide) from the fuel gas. Alternatively, if neutral water is used, $H_2S$ may remain in the fuel gas. Consequently, there will be sulfur dioxide in the flue gas that can be removed by scrubbing.

The fuel gas produced is typically in excess of the amount required to operate the pyrolysis reactors. In typical installations, excess fuel gas is disposed of by flaring, which wastes a valuable energy source. However, the excess fuel gas may instead be used as a sustainable source of fuel for power production. A preferred method of power production is a generator driven by a reciprocating engine. The reciprocating engine can be the spark ignition or the compression ignition type. In either example, the excess fuel gas is aspirated into the engine together with the intake air and reduces the amount of other fuels needed.

The pyrolysis oil contains different types of hydrocarbons (aromatics, olefins and naphthenes) as well as various molecules with hetero atoms (mercaptans, amides, acids, nitriles, benzothiazoles). The various types of molecules have differing reactivities towards hydrogen. Olefins are the easiest to hydrogenate. Mercaptans, nitriles and acids are also relatively easy to hydrogenate. Amides and benzothiazoles are more difficult to hydrogenate. It is possible to operate a hydroprocessing system to deliver any desired degree of desulphurization.

In hydroprocessing, the tire pyrolysis oil is desulfurized by a hydrodesulfurization (HDS) reaction of organosulfur compounds with hydrogen over a catalyst, leading to the extrusion of sulfur as $H_2S$ with concomitant production of the corresponding hydrocarbon. Hydroprocessing may be beneficially incorporated either on the full range tire pyrolysis oil (prior to distillation), or may be applied to selected distillation cuts such as diesel.

The hydrogenation reactions may take place at pressure of about 20 to about 100 bar, temperature of about 300 to about 400° C. and at LHSV of about 0.5 to about 2.0 per hour. In general, mild conditions will consume less hydrogen and may hydrogenate olefins and mercaptans, leaving benzothiazoles and aromatics unconverted. Mild conditions may be used reduce the sulfur content to about 0.1 to about 0.5%, which may be sufficient for applications in the marine fuel market. More severe conditions will consume additional hydrogen, but may lower sulfur content to about 10 to about 50 ppm and will convert a fraction of aromatics to naphthenes.

Due to the relatively small scale of production, packed bed hydrogenation technology is preferred, in particular trickle-flow. In a trickle-flow reactor, the liquid is fed to the top of a bed of catalyst together with gas containing hydrogen. Typically, this will be a combination of recycle gases (dissolved in the liquid exit hydrogenation) and make-up hydrogen. The amount of hydrogen present in the reactor is typically about 2 to about 5 times the amount required stoichiometrically. Due to the presence of large amounts of olefins in the feed material, there will be a large heat release in the reactor.

Since olefins are highly reactive compared to other species present, the heat release associated with olefin hydrogenation will typically be released close to the catalyst inlet. Consequently, in general, the most practical way to deal with the heat of reaction while maintaining an acceptable temperature rise is to recirculate cooled treated liquid as a diluent. This increases the size of the catalyst bed, but does have the beneficial effect that material typically takes several passes through the reactor giving the more difficult molecules additional time to react. The recycle ratio necessary to control the exotherm is typically about 1:1 to about 4:1.

If hydroprocessing is performed prior to distillation, the full range pyrolysis oil may be pressurized using a pump, heated to reaction temperature and mixed with recycle liquid. The mixed liquid may then be fed to hydrotreating at the top of trickle bed reactor. Mixed gases consisting of recycled flash gases and make-up hydrogen are also fed to the top of the trickle bed. The liquid and gas leaving the reactor may be separated using a flash vessel and the vapor phase may be recycled. The material is then cooled and a portion recycled with a pump or the like. The balance of the material is flashed through several stages with flash gases (dominantly hydrogen) recycled to the hydroprocessing reactor.

The final flashed material is fed to distillation and preferably distilled into up to four cuts comprising at maximum naphtha, kerosene, diesel and fuel oil. Distillation may be carried out using any conventional distillation column sequence, incorporating one or more side draws in addition to overhead and bottoms products. A preferred method employs a two column system, the first column operating at or slightly above atmospheric pressure to produce fuel gas (including hydrogen sulfide and carbon oxides) naphtha and water as overhead liquid products, kerosene as an optional side draw product and a combined diesel plus fuel oil material as a bottoms product. The diesel plus fuel oil mixture may be conveniently split into separate diesel and fuel oil streams using vacuum distillation. Typically, the reboilers on the columns are operated at temperatures below about 275° C. to avoid product degradation. This is conveniently accomplished using hot oil, for example.

As mentioned above, sulfur compounds are ultimately converted to hydrogen sulfide in the hydroprocessing reactor. Nitrogen compounds are converted to ammonia and oxygen compounds to water and carbon oxides. Furthermore, there are some low molecular weight hydrocarbons formed during the hydroprocessing reactions (for example, low molecular weight mercaptans yield the respective alkanes). These materials have a relatively low solubility in the hydrotreated hydrocarbon and, consequently, tend to revert to the vapor stream as the hydrotreated oil is cooled and flashed to lower pressure. It is possible to cool and flash the hydrotreated oil to remove enough hydrogen that the loss of hydrogen to fuel gas from the distillation section is acceptably low. There is no need to recover hydrogen (for example, using pressure swing adsorption) which is a significant advantage.

The hydrogen sulfide, ammonia, water and carbon dioxide also tend to be concentrated in the gas phase when the hydrotreated oil is cooled and flashed. The gas phase may be compressed to recirculate hydrogen. The ammonia, $H_2S$ and $CO_2$ may be conveniently removed from the circulating hydrogen using water and an alkali solvent. The loaded solvents are treated together with materials removed when cleaning the pyrolysis fuel gas.

Optionally, the fuel oil product is thermally treated by heating it to a temperature of about 350° C. to about 425° C.

and allowing the fuel oil product to react without catalyst for a period of about 60 minutes to about 4 hours. The reaction can conveniently take place in an external reaction vessel that may be fitted with a hot oil coil to maintain the temperature. The fuel oil range liquid may be continuously pumped from the sump of the distillation column through a heater and continuously fed to the reaction vessel at a temperature of about 350° C. to about 425° C. The vessel preferably operating at a pressure close to atmospheric with the vapor phase able to pass continuously to the atmospheric distillation column. The liquid phase from the reaction vessel may also be continuously fed to the first distillation column.

At the subject operating conditions, free radical reactions take place, in particular, the high molecular weight components of the fuel oil crack to form a broad range of lighter components. In addition, some rearrangement reactions are expected to form components such as limonene from dimers of isoprene. The cracked material is a broad range of materials including naphtha through diesel range molecules in addition to unconverted and incompletely converted fuel oil. The conditions and operation are broadly comparable to those used in visbreaking operations in oil refining.

Typically the hydrotreated naphtha is of relatively low value and, as noted above, fuel gas is typically in excess. Consequently, low-value fuel product is typically available to produce sustainable power on-site. Naphtha and fuel gas may be burned in either a gas turbine, a reciprocating engine or the like (as noted above). A reciprocating engine is generally preferred due to considerations of scale. Naphtha is a poor fuel for engines since it has a low octane rating and, therefore, is a poor spark ignition engine fuel and too volatile for a conventional diesel engine. However, adaptation of compression ignition engine using either the Homogeneous Charge or the Reactive Charge principle make utilization of naphtha possible.

The low-cost power may be advantageously used to make low-cost hydrogen typically using an alkaline electrolyzer, preferably, at pressure to deliver the hydrogen either directly to the reactor or to one of the interstage points on the hydrogen compressor.

Additionally, to improve value and marketability of the fuel products, the fuel products may be blended with fuel products from other sources. Suitable materials for blending include crude oil-derived fuel, natural gas-derived fuel, coal-derived fuel, biomass-derived fuel and plastic-derived fuel. Preferably, the fuel products may be blended to balance chemical compositions of the individual components.

Exemplary practice of our methods and the products thereof will now be described with reference to FIG. 1. As shown, end-of-life tires are shredded and fed to the pyrolyser 1. In the pyrolyzer 1, the shredded tires are heated indirectly by hot gases produced by combustion of fuel gases in the combustion zone 2. The hot combustion gases are preferably recirculated within the pyrolyzer 1 to limit the heat transfer surface temperature and prevent over-cracking of the pyrolysis products. Excess flue gas may be discharged to heat recovery (for example, to produce hot oil for use as a utility or in downstream processes), scrubbed to remove sulfur and nitrogen oxides and/or treated (typically using activated carbon and a bag filter) to remove dioxins and particulates.

The raw Recycled Carbon Black (or char) from pyrolysis 1 is preferably sent to rCB upgrading such as milling or the like to liberate carbon black from amorphous carbon and inorganics.

Hot vapors from pyrolysis that are not recirculated in the pyrolyzer 1 are conveyed to the condensing zone 3, where the vapors are cooled with cooling water. The heavier hydrocarbons (naphtha through Fuel Oil) condense, leaving lighter components in the gas phase (shown as non-condensables).

The non-condensables are scrubbed by aqueous liquor (e.g., dilute NaOH) in the scrubber (4) to remove hydrogen sulfide and entrained particulates. The scrubbed fuel gas may be split with a major amount being sent to the combustion zone 2 to provide heat for pyrolysis with surplus fuel gas (which may be intermittent) being sent to a generator 5. Power from the generator 5 may advantageously be used in the plant such as in the electrolyzer 8 to provide hydrogen for the hydroprocessor 6.

The generator 5 may be driven by a reciprocating engine, a gas turbine or the like. In either example, the fuel gas is blended into the air intake. Reciprocating engines are a more scale-appropriate choice for a typical end-of-life tires recovery facility. The reciprocating engine generator is preferably adapted to use at least three separate fuels. One fuel is excess fuel gas as described above. A second fuel is fuel gas from distillation that contains hydrogen and light hydrocarbons. The third fuel is naphtha from distillation.

Depending on the details of operation of the internal combustion engine of the generator 5, a supplementary fuel (diesel) may be needed. It is possible to operate the engine as a homogeneous charge compression ignition engine (HCCI). However, it is likely that a compression engine operates on the reactive charge compression engine (RCCI) principle, alternatively with the naphtha introduced as a vapor through the air intake. In these latter configurations, conventional diesel is used as a pilot fuel. It is also possible to use a spark ignition principle. However, in view of the low octane value of the fuel, it may be necessary to greatly reduce the compression ratio.

The liquid from the condensing zone 3 is separated into aqueous and non-aqueous components. The aqueous liquid is combined with the spent liquor from scrubbing and sent to disposal. The non-aqueous liquid passes to the hydroprocessor 6, which is described below in more detail.

After hydroprocessing, the hydro-processed oil is forwarded to a distillation column 7. In the distillation column 7, the material is separated into product streams and any dissolved fuel gas is liberated. Typically, this is accomplished using two distillation columns, thus reference herein to "a distillation column" is inclusive of a system including multiple distillation columns. Fuel gas is the non-condensable stream (if any) from the first distillation column that produces naphtha as overhead, kerosene as side draw and bottoms stream with the heavier components. The bottoms stream from the first distillation column is forwarded to a second distillation column that produces diesel as an overhead product and fuel oil as a bottoms product.

Figure 2:
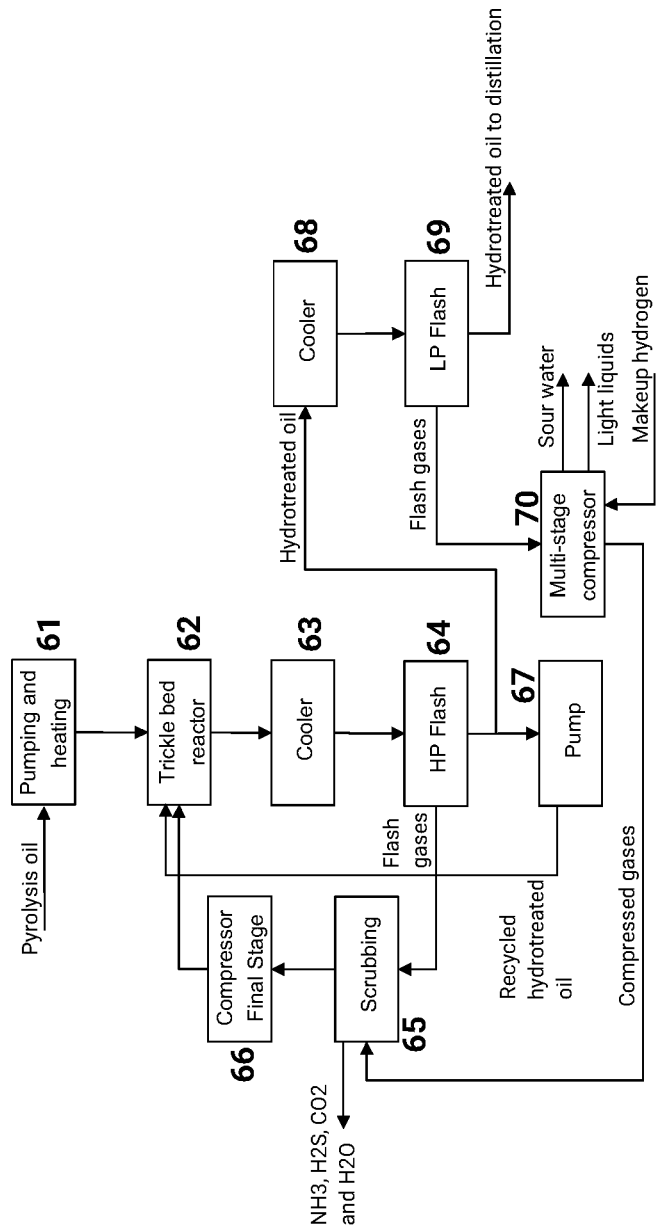
FIG. 2 shows an exemplary hydroprocessor.

FIG. 2 depicts the process diagram of an exemplary hydroprocessor 6. Pyrolysis oil is received from Condenser 5 of FIG. 1 at roughly ambient conditions and is pressurized to process pressure of about 20 to about 100 bar and heated to reactor inlet temperature of about 300° C. to about 350° C. in pumping and heating section 61. This may be done, for example, using centrifugal pumps and a shell and tube heat exchanger heated with hot oil. The pyrolysis oil then passes to the trickle bed hydrogenation reactor 62. On entering the trickle bed hydrogenation reactor 62, the pyrolysis oil is mixed with recycled hydrogenated oil, hydrogen and vapors recycled with the hydrogen. The recycled oil may be at a temperature of about 300° C. to about 350° C. while the hydrogen may be at about 200° C. to about 300° C. Recycled oil is preferably used in a ratio of about 1 part recycle to about 1 part feed and about 4 parts recycle to about 1 part feed. The recycled oil has a low reactivity towards hydrogen as the easy to convert fractions (olefins and mercaptans) will have reacted already. Consequently, the recycled oil acts as a diluent to reduce the temperature rise associated with the hydrogenation reactions (especially of olefins).

Preferably, the amount of hydrogen circulating in the reactor greatly exceeds the amount required by stoichiometry, typically at a ratio of about 2 to about 5 times stoichiometric. The minimum amount of hydrogen is determined by hydrogen solubility in the low-pressure flash, while there is no firm upper limit.

The trickle bed hydrogenation reactor 62 contains a fixed bed of hydrogenation catalyst, preferably in the form of pellets or extrudates, through which the liquids and gas phase pass in a vertically downward direction. The desulfurization uses a conventional hydrodesulfurization catalyst as is typically used in distillate hydrotreating units, based on cobalt, nickel and molybdenum sulfides, for example, Haldor Topsoe TK-5XX BRIM®, alternatively HCE catalysts HDC-10 or HDC-20 alternatively other NiMoS or CoMoS catalysts. Ideally, the selected catalyst will have high activity for converting hetero-atoms other than sulfur, particularly oxygen and nitrogen, and the catalyst will be reasonably tolerant towards potential poisons in the feedstock, such as heavy metals.

The reacted mixture of liquid and vapor is cooled in the cooler 63 to a temperature of about 300° C. to about 350° C. and then passes to the flash 64 in which the vapor phase (including hydrogen, ammonia, $H_2S$, carbon dioxide, water and light hydrocarbons) is separated from the liquid phase (including treated pyrolysis oil containing significant dissolved gases). This occurs at a pressure close to reactor pressure, i.e. about 20 to about 100 bar.

The flash gases go to a scrubbing section 65 in which the sulfur, nitrogen and oxygen are removed in the form of $NH_3$, $H_2S$, $H_2O$ and $CO_2$. Scrubbing may be done using scrubbing towers, circulating water to remove ammonia followed by alkali solution (typically NaOH) to remove $H_2S$ and $CO_2$. Alternatively, scrubbing may be done using adsorbent beds of appropriate materials, possibly configured to function in pressure swing mode with the contaminants going to fuel gas.

The cleaned gases proceed to the final stage of compression 66 and are returned to the reactor. The final stage of compression has a high flow and a relatively low compression ratio as essentially is overcoming the pressure drop through the reactor.

The liquid from the high-pressure flash stage is split into two portions. One of these is pressurized using pump 67 and recirculated to the reactor 62. The other stream is cooled to an appropriate temperature to be fed to distillation in cooler 68 and is let down to a pressure close to atmospheric in LP flash 69. It is possible to accomplish the let down in stages corresponding to the stages of the multistage compressor 70, but typically the added complexity is not justified due to the relatively low scale of production. A primary purpose of cooling and LP flash is to remove the major portion of dissolved hydrogen so that it may be recycled. This enables the significant process simplification in downstream processing equipment in that the hydrogen dissolved in the hydrotreated oil leaving the low-pressure flash may go to fuel without negatively impacting the economics.

The flash gases from the low-pressure flash are recompressed in multi-stage compressor 70. This compressor requires multiple stages because it operates with a very high compression ratio about 15:1 to about 100:1. The gas is rich in hydrogen and consequently typically is handled with reciprocating compressors with stage compression ratios of about 2:1 to about 3:1. Following typical practice, intercoolers and removal of liquids are between stages. The liquids include hydrocarbons that may be recycled to hydrogenation (and ultimately build up to leave in the hydrotreated oil to distillation), or in the lighter materials may be directed to the fuel system, as well as sour water containing water, ammonia, $H_2S$ and $CO_2$ that is directed to the scrubbing system.

We claim:

1. A method of producing desulfurized fuel produced from pyrolysis of waste tires comprising:
   pyrolyzing waste tires to obtain a vapor phase and a solid phase;
   a) condensing the vapor phase in a condenser to obtain the tire pyrolysis oil and a remaining vapor phase;
   b) scrubbing the remaining vapor phase with water or an alkali to form a scrubbed fuel gas;
   c) scrubbing the remaining vapor phase with water or an alkali to form a scrubbed fuel gas;
   d) desulfurizing the tire pyrolysis oil by hydroprocessing the tire pyrolysis oil to desulfurize the tire pyrolysis oil and obtain a hydro-processed pyrolysis oil; and
   e) distilling the hydro-processed oil into at least two fuel products selected from the group consisting of kerosene, naphtha, fuel oil, fuel and diesel;
   f) recovering the fuel gas and combusting the fuel gas in a generator as a fuel source to generate electricity,
   g) utilizing the electricity supplied by the generator to generate hydrogen by electrolysis,
   h) utilizing the hydrogen to perform hydroprocessing of further tire pyrolysis oil; and
   i) removing the solid phase for recovery of carbon black.

2. The method according to claim 1, wherein the hydroprocessing is performed at a pressure of 20 to 100 bar, a temperature of 300 to 400° C. and a liquid hourly space velocity of 0.5 to 2.0 per hour.

3. The method according to claim 1, wherein the hydroprocessing is performed in a trickle-flow reactor.

4. The method according to claim 1, wherein the hydroprocessed pyrolysis oil has a sulfur content of 10 to 50 ppm.

5. The method according to claim 1, wherein the hydroprocessing is hydrogenation.

6. The method according to claim 1, further comprising recovering at least one of the fuel products from the distilling step and utilizing the at least one fuel product as a source of fuel to generate heat to pyrolyze waste tires or generate electricity to power an electrolyzer that produces hydrogen used in the hydroprocessing of further tire pyrolysis oil.

* * * * *